United States Patent [19]

von Hartitzsch

[11] 4,022,185

[45] May 10, 1977

[54] HEAT ACTUABLE DIRECTING DEVICE

[76] Inventor: Peter von Hartitzsch, 409 Jervois Street, Hastings, New Zealand

[22] Filed: July 28, 1975

[21] Appl. No.: 599,352

[52] U.S. Cl. .............................................. 126/271
[51] Int. Cl.² ........................................ F24J 3/02
[58] Field of Search ............ 126/270, 271; 237/1 A

[56] References Cited

UNITED STATES PATENTS

| | | | |
|---|---|---|---|
| 1,240,890 | 9/1917 | Shuman et al. | 126/271 |
| 2,993,125 | 7/1961 | Geer et al. | 126/271 X |
| 3,273,558 | 9/1966 | Boothe | 126/271 |
| 3,884,414 | 5/1975 | Baer | 126/271 |

*Primary Examiner*—Kenneth W. Sprague
*Attorney, Agent, or Firm*—Cushman, Darby & Cushman

[57] ABSTRACT

A heat actuable directing device suitable for directing a member such as a solar energy collection device to more favored dispositions with respect to the source of heat which actuates the device. The device itself consists of the member to be directed, a fluid container positioned so as to receive more heat from the source of heat when the member to be directed is at a less favorable disposition than it would if at its more favored disposition, a fluid actuable force applying means associated with the member capable of moving the member from a less favored disposition to a more favored disposition with respect to the source of heat and a fluid tight conduit means operatively connecting said fluid container and said fluid actuable force applying means so as to convey fluid pressure increases from the container to the force applying means to thus move said member to be directed to said more favored disposition whenever necessary.

3 Claims, 2 Drawing Figures

HEAT ACTUABLE DIRECTING DEVICE

BACKGROUND OF THE INVENTION

1. Field of the Invention

This invention relates to a heat actuable directing device capable of moving a member to be directed to a more favoured disposition with respect to the source of heat, such as the sun, which actuates said device, should the source of heat move relative to said member. The heat actuable directing device in accordance with the present invention preferably derives all its energy requirements from the source of heat which determines the favoured disposition.

2. Description of the Prior Art

With the current emphasis upon meeting energy requirements without resorting to the exploitation of oil or other fossil fuels, there is a growing interest in the use of solar energy. To this end, many types of collectors have been devised and all are satisfactory to some extent or other. It is fundamental however, when dealing with solar energy collection to realize that the amount of heat absorbed is totally dependent upon the area of the collection surface visible to the sun. Accordingly, unless some means is provided to align solar collection devices to optimal dispositions with respect to the sun as the sun moves, the effective collection area, i.e. the area projected on to a plane normal to the sun's rays, would be well below the optimum for the actual surface area and cost of the particular solar energy collection device. In the past means have been provided whereby backup energy sources are utilized to move solar energy collection devices with respect to the sun as it moves. The programming of such movement has been controlled by such well known devices as photocells. Less accurate devices have been devised which involve a timed movement. All prior art methods, however utilize a backup energy source and do not derive their energy requriements for aligning the member to be directed from the source of heat itself, e.g. in the case of solar energy collection, the sun.

SUMMARY OF THE INVENTION

The present invention is a heat actuable directing device suitable for use in the field of solar collecton or in other fields such as fire fighting in that it is in a form which allows for embodiments of the invention to be devised which are self-sufficient energy-wise.

Accordingly in one aspect, the present invention consists in a heat actuable directing device comprising a member to be directed to a more favoured disposition with respect to the source of that which actuates said device, a fluid container positioned so as to receive more heat from said source of heat when said member to be directed is at a less favoured disposition that it would if at its more favoured disposition, a fluid actuable force applying means associated with said member capable of moving said member from a less favoured disposition to a more favoured disposition with respect to said source of heat, and fluid tight conduit means operatively connected between said container and said fluid actuable force applying means to convey fluid pressure increases caused by the receiving of more heat by said container to said fluid actuable force applying means to thus cause the same to operate and move said member to said more favoured disposition and hold the same there at least momentarily until such time that any movement of the heat source relative to said member results in there being defined a different more favoured disposition.

In a further aspect the invention consists in a heat actuable directing device comprising a member to be directed by said device to a preferred disposition with respect to the source of heat which in use actuates said device, a closed fluid container mounted so as to be in a contant relationship with said member to be directed, shield means associated with said closed fluid container which shields said container from said source of heat when said member is at its said preferred disposition with respect to said source of heat but which allows rays of heat from said source of heat to reach said closed fluid container in at least some circumstances when said member is not at a said preferred disposition, a fluid actuable force applying means associated with said member to be directed capable of applying force thereto and thereby moving said member to be directed when actuated by a variation in fluid pressure, a fluid tight conduit means from said fluid container to said fluid actuable force applying means which conveys fluid pressure variations caused by different amounts of heat being received by said closed fluid container to said fluid actuable force applying means.

In yet a further aspect, the present invention consists in a solar heat actuable directing device comprising a member to be directed to a more favourable disposition with respect to the sun, said member having associated therewith solar energy collection means, a fluid container in a constant relationship with said member to be directed, shield means associated with said fluid container arranged to shield said container from said sun when said member to be directed is at its most favoured disposition with respect to the sun but which permits sunlight to reach said container when said member to be directed has fallen behind the movement of the sun, a fluid actuable force applying means associated with said member to be directed capable of moving said member from a less favoured disposition to a more favoured disposition with respect to said sun upon receiving an appropriate modified fluid pressure caused by changes in the amount of heat from the sun being received by said fluid container, and fluid tight conduit means operatively connected between said container and said fluid actuable force applying means to convey fluid pressure changes from said container to said fluid actuable force applying means.

BRIEF DESCRIPTION OF THE DRAWING

One preferred form of the present invention will now be described with reference to the accompanying drawings in which.

DESCRIPTION OF THE PREFERRED EMBODIMENT

In the preferred form of the present invention, the source of heat is the sun and accordingly the member to be moved is a solar energy collection device. This device may be of any suitable type, e.g. a thermopile for generating electricity, a solar energy collection device which uses the glass house effect to raise the temperature of a fluid or a solar energy collection device which relies upon a parabolic or the like reflector to raise the temperature of a fluid. Where a fluid is used in the solar collector then means should be provided to channel such fluid from the member to be directed without adding undue drag effects which will be detrimental to the tracking thereof. In the preferred form of the present invention, the fluid container of the present invention is mounted rigidly to the member to be directed and accordingly, in that sense the member to be directed may be considered as a support surface upon which is mounted both the fluid container and the, or an array of, solar energy collection devices.

In other forms of the invention however, the fluid container need not necessarily be mounted rigidly in respect to the solar energy collection device. It is anticipated that in some embodiments a single fluid container would actuate a member which would be linked to other members so that as a result a single heat actuable directing device directs a plurality of members. In still other embodiments a first member could be used to operate electrical switches or connectors to thus actuate other members to be directed. It is possibly also feasible to provide a single fluid container having a plurality of conduits leading therefrom which each actuate a fluid actuable force applying means associated with each member to be directed thereby. In this sense, it would not be necessary for there to be a solar collector at all mounted in a fixed relationship with the fluid container.

Figure 1:
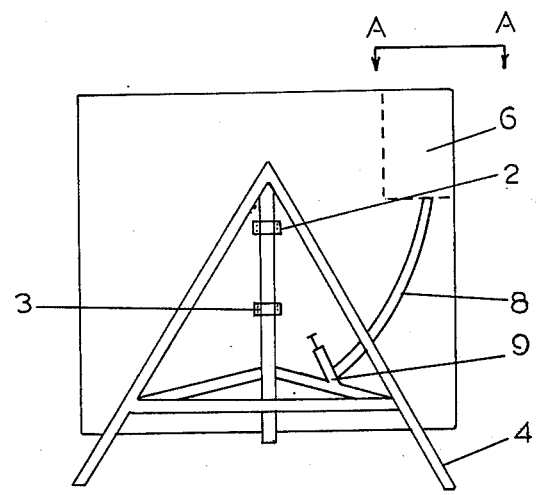
FIG. 1 is a simple diagrammatic view of the device from behind (i.e. from that side which in use will be remote from the source of heat which is the sun) and, FIG. 2 is a simplified diagrammatic cross-sectional view from the direction A—A and over the extent thereof shown in FIG. 1, the view being a cross-section of the fluid container and the means provided to accentuate the temperature raising effect thereof (the outline of which is partially shown in FIG. 1 by the broken lines).
Figure 2:
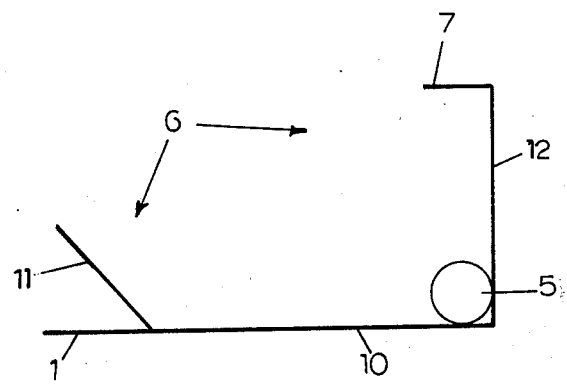

In FIG. 1 there is provided the member to be directed 1 (only shown over extent of A—A) which is pivoted about a pivotal axis at points 2 and 3 to a frame 4 in such a way that the member 1 may be rotated around the axis of rotation for 180° or more. The inclination from the vertical of the pivotal axis depends on the latitude, i.e. would be substantially vertical at the pulse but would be substantially horizontal at the equator. In between the extremes the efficiency of a single alignment is subject to the movement of the sun which accompanies seasonal changes. Accordingly, it would be desirable to provide means whereby the pivotal axis may be aligned periodically more in keeping with the seasonal positions of the sun. In the drawings, it should be realized that the embodiment shown is particularly adapted for use in the southern hemisphere. For forms of the present invention to be used in the northern hemisphere, various components of the apparatus would require lateral inversion. Mounted on the surface of the member 1 on the side of the member 1 facing the sun would be the solar energy collection device which may be of any suitable type. Mounted on the same side is the fluid container. The fluid container 5 extends down the length of a shielding member 6, the outline of which is partially indicated in FIG. 1 by the dotted outline. The shield 6 has a portion 7 which overlies the longitudinal length of the fluid container 5 which in the most simplified form is a cylinder sealed at each end, having a suitable black matt finish and a conduit 8 leading therefrom to the said fluid actuable force applying means 9 which in the preferred form of the present invention is a plunger mechanism spanning from the frame 4 to the member 1 in such a manner that the piston and cylinder are relatively movable in two ways, i.e. pressure and reduced pressure to the plunger mechanism would move the member 1 one way or the other about the pivot points 2 and 3. The function of the shield member 6 is to shield the fluid container 5 from the source of heat when the member 1 is optimally aligned. Obviously then it would be necessary to finely tune the whole device to ensure that it works as required e.g. by using biassing springs, etc. In FIG. 2 there is shown a simplified diagrammatic cross section of the shield member 6. This shield member 6 is adapted for use in the southern hemisphere and comprises a member having reflectorized internal surfaces. In use when the member to be directed is ideally aligned, the sun's rays will be substantially vertical to portions 7 and 10 of the shield 6. When the sun is not positioned directly overhead the portion 7, the reflectorized portion 11 directs rays directly on to the container 5 or indirectly via portions 7 and 12 on to the container 5. In cases of severe misalignment rays would travel from 11 to 10 on to the container 5. In cases of such gross misalignment rays from the sun would be incident on the container 5 itself. From the foregoing, it should be clear to a person skilled in the art that the reflective internal surface of the shield 6 accentuates the heating effect of mis-alignment on the container 5. As a consequence increased fluid pressure causes the piston 9 to move the member 1 to a position where the fluid container 5 is again protected from the direct rays of the sunshine. It will be clear to a person skilled in the art that the further the fluid container 5 is spaced from the portion 7 the better as it ensures that even a slight misalignment of the member 1 from its optimal position with respect to the sun is sufficient to cause an accentuated temperature raising effect upon the fluid contained in the container 5.

It will be clear to a person skilled in the art that the frame 4 is such that the member 1 is mounted at an inclination which will enable the maximum possible area to be presented to the sun and will vary according to latitude and preferably season. Accordingly, the function of the heat actuable directing device is to control the rotational tracking of the sun by the member 1. Accordingly, it is necessary to ensure that the shield 6 is positioned correctly so that the member 1 is aligned at sunrise or shortly thereafter and is still aligned at sunset or until shortly before.

In the preferred form of the present invention only a single fluid container conduit and fluid actuable force applying means has been shown. It should be realized that in some forms of the present invention, it may be desirable to have two or more systems mounted in an opposing fashion to provide a balance effect when gas is used as the fluid instead of liquid to ensure the return of the member 1 to the sunrise position shortly after sunrise. However, provided a suitable and very efficient plunger mechanism is employed, the loss of temperature by the fluid contained in the fluid container 5 will be sufficient to cause the withdrawal of the member 1 from its sunset position to its sunrise position. it may be necessary however, to employ a spring or other suitable biassing means to assist this return. Such a biassing means however, should be such that it does not prevent the member 1 from being tracked correctly onto the sun during sunshine hours.

In other preferred forms of the present invention it may be desirable to direct the member both horizontally and vertically in which case a plurality of directing devices could be employed to obviate the need for any type of pivot. The cost of a system however, would be considerably increased. It would be possible however, by using a simple universal mounting to use two or three heat actuable directing devices to give control over both directions.

The apparatus shown in the drawings is a simplified form only. The fluid employed in the preferred form of the present invention would be a readily expansible liquid, for example, methylated spirits. Mercury or the like could be used but for the most economic use an alcohol should be used. In some forms of the invention a pressurized gas could be used. The shield member 6 is preferably made from metal which has the inner surface thereof reflectorized, e.g. by the use of an aluminium foil or coating. The conduit 8 is preferably a readily flexible conduit which does not expand significantly with pressure or heat. The cross-sectional fluid passage area of said conduit would preferably be small. The fluid actuable force applying means preferably is itself mounted in a pivotal or universal manner both with the frame 4 and the member 1 to ensure that the movement of the member 1 relative to the frame 4 does not cause undue stress and as a result wear to the components thereof.

In other preferred forms of the present invention the heat actuable directing device of the present invention may be employed to direct a substantial fire fighting jet via a reasonably large nozzle for fire extinguishing purposes. It would be possible for a member having such a nozzle mounted thereon to track the fire while at the same time playing an extinguishing liquid or fluid thereonto. From the foregoing description in regard to the solar energy collection device, a person skilled in the art will readily appreciate the manner in which the present invention may be used to this end.

From the foregoing therefore, it can be seen that the present invention provides a heat actuable directing device which derives its activation energy requirements from the source of heat itself and will not usually require any backup energy system, although in some examples it may be usefully combined with electrical switch gear.

I claim:

1. A solar heat actuable directing device comprising a pivotally mounted member to be directed to a more favourable disposition with respect to the sun as the sun moves during the day time, said member having associated therewith solar energy collection means, a fluid container in a constant relationship with said member to be directed, shield means statically associated with said fluid container arranged to shield said container from said sun when said member to be directed is at its most favoured disposition with respect to the sun but which permits sunlight to reach said container when said member to be directed has fallen behind the movement of the sun, fluid actuable ram means associated with said member to be directed capable of moving said member about its pivotal mounting from a less favoured disposition to a more favoured disposition with respect to said sun upon receiving an appropriate modified fluid pressure caused by changes in the amount of heat from the sun being received by said fluid container, and fluid tight conduit means operatively connected between said container and said fluid actuable ram means to convey fluid pressure changes from said container to said fluid actuable ram means.

2. A heat actuable directing device as claimed in claim 1 wherein said fluid is a liquid.

3. A heat actuable directing device as claimed in claim 1 wherein there is provided means to accentuate the heating effect of sunlight on said fluid container when said container is not being shielded by the shield means from the sun so that even minor variations from the most preferred disposition with respect to the sun will cause the said fluid actuable ram means to move.

* * * * *